Oct. 21, 1952            J. EIDA            2,614,521

WALLPAPER TRIMMING AND PASTING AND MEASURING MACHINE

Filed March 3, 1950            6 Sheets-Sheet 1

Fig. 1.

INVENTOR,
Jacob Eida
BY
Lloyd W. Batch
ATTORNEY.

Oct. 21, 1952 J. EIDA 2,614,521
WALLPAPER TRIMMING AND PASTING AND MEASURING MACHINE
Filed March 3, 1950 6 Sheets-Sheet 2

INVENTOR,
Jacob Eida
BY
Lloyd W Patch
ATTORNEY

Fig. A.

INVENTOR,
Jacob Eida
BY
Lloyd W. Patch
ATTORNEY.

Oct. 21, 1952     J. EIDA     2,614,521
WALLPAPER TRIMMING AND PASTING AND MEASURING MACHINE
Filed March 3, 1950     6 Sheets-Sheet 6

INVENTOR,
Jacob Eida
BY
Lloyd W. Patch
ATTORNEY.

Patented Oct. 21, 1952

2,614,521

UNITED STATES PATENT OFFICE 2,614,521

WALLPAPER TRIMMING AND PASTING AND MEASURING MACHINE

Jacob Eida, West Hollis, N. H.

Application March 3, 1950, Serial No. 147,513

6 Claims. (Cl. 118—9)

My invention relates to improvements in wallpaper trimming and pasting and measuring machines, and particularly to a machine of this character intended and adapted to be used by a paperhanger or other person to prepare wallpaper and other wall coverings for application to or hanging upon a wall or ceiling.

An object of my present invention is to provide a machine for preparing wall or ceiling paper of any texture or character, of any width, so that a strip of the desired length trimmed to the desired width and matching edge, and with paste applied thereto, is available for hanging or application to a wall or ceiling.

Another object is to provide apparatus of this character which will take rolls of paper of any desired width, will trim one or both edges to give a desired width and to prepare the edges for pattern or other matching, will apply paste to the paper as drawn out or taken from the roll, will measure a desired length for a particular ceiling width or wall heighth, and will thus permit cutting substantially transversely across the strip as drawn out to the predetermined length.

Another purpose of my invention is to provide means for measuring the strip length, which is in the form of a cable to be drawn out to the desired length from a cable-winding drum, and which cable will assist in unreeling the desired length of wallpaper, thus preventing tearing or damage to the strip of paper having paste applied thereto.

Another object is to provide adjustable means to measure the length of the strip, and to assist in withdrawal of the strip of paper from the roll, and at the same time to positively operate the paste-applying roll and paste-fixing mechanism, thus assuring a desired particular length of the strip with paste fully and properly applied thereto.

Still another purpose is to provide means for adjusting the amount of paste as applied to the paper, and to assure that the paste is evenly spread and that excess paste is removed.

A further purpose is to provide a roll holder and trimming means that can be relatively adjusted to take various widths of wallpaper and to trim the edges at an exact line as desired or necessary to match a pattern or to accomplish a desired width of the strip of paper having paste applied thereto and made available for application to a wall or ceiling.

Yet another object of my invention is to provide a compact and readily portable wallpaper trimming and pasting and cutting machine designed as one compact unit, easily set up or assembled, and which has all the parts thereof constructed and associated to be readily folded into a compact and small case to be readily portable and of such size and weight as to be readily carried by the user from one place to another, and from one job to another, after the manner of the usual tool box or chest or case as employed by paperhangers.

Yet a further purpose is to provide a machine of this character which is compact, readily portable, and which can be set up in no more space than the space usually required for a paperhanger's table, and which will allow accomplishment of several operations simultaneously that ordinarily must be carried out separately.

A further object is to so construct the machine that foldable and extensible leg structure is provided for supporting the machine when in use, together with casing or covering structure that can be assembled and applied to serve as a carrying case or housing when the machine is being transported, and which can be folded out and supported on the extensible leg structure to serve as a cutting table or support when the machine is set up for use.

With the above and other objects in view, some of which will be hereinafter set forth, and others of which are inherent in the construction and assembly and use of the machine, my invention includes certain novel features of construction and combinations and associations of parts which will be hereinafter set forth in connection with the drawings and then pointed out in the claims.

A supporting base or table top 1 has sets of folding legs 2 and 3 hingedly connected on the lower side thereof toward opposite edges, and a foldable extension frame 4 is hingedly connected with the legs 3 adjacent to the supporting base or table top 1 to be folded up to a position to extend substantially horizontally at one side of the supporting base or table top 1, when this base is supported in elevated position by the legs 2 and 3. A set of legs 5 is foldably mounted at the outer extremity of the foldable extension frame 4, and when these legs are in supporting position, the foldable extension frame is firmly supported in the upright or elevated position for use. Releasable braces 6, 7 and 8 are provided to hold the sets of legs 2, 3 and 5 in the extended and supporting relation.

Supporting end members 9 and 10 are mounted by brackets 11 and 12, respectively, at opposite ends of the supporting base or table top 1. These supporting end members 9 and 10 are made substantially rectangular so that they will serve as end closures when the machine is packed for transportation or carrying. The cover consists of a cover top portion 13 having cover side portions 14 and 15 hingedly connected therewith. The cover top portion is of such width that it will extend substantially across the length of the supporting end members 9 and 10, and the cover side portions 14 and 15 are of such width that when they are folded down they will substantially reach to the top of the supporting base or table top 1.

Figure 15:
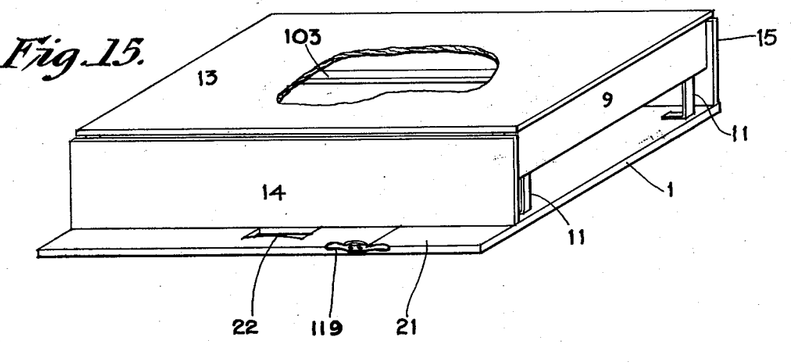
Fig. 15 is a view in perspective showing the machine as this appears when taken down or folded and when ready for transportation.
Figure 16:
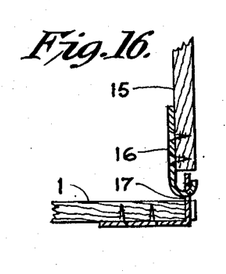
Fig. 16 is a fragmentary sectional view showing one of the cover holding anchor hooks.
Figure 17:
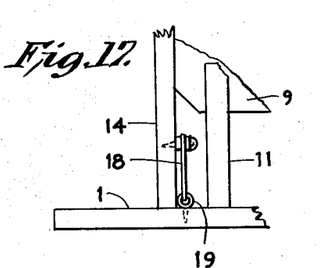
Fig. 17 is a fragmentary view showing one of the cover retaining hooks.

In the covering or closing position, the top portion 13 will rest upon and bridge across the supporting end members 9 and 10, and the side portions 14 and 15 will be swung down adjacent to the ends of the supporting end members 9 and 10, after the manner shown in Fig. 15. The side portion or member 15 has hooks 16 at the outer edge thereof positioned to engage through eyes 17 carried at one edge of the supporting base or table top 1, and fastening hooks 18 on the side portion 14 are adapted to be fitted into fastening eyes 19 on the supporting base or table top. By this arrangement of parts, the cover comprising the top portion 13 and side portions 14 and 15 can be fitted in place and can be secured to provide a cover, after the manner illustrated in Fig. 15.

Figure 14:
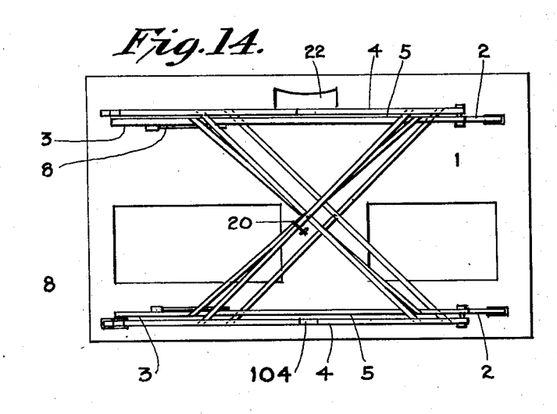
Fig. 14 is a view in elevation of the supporting structure and leg assembly as this appears when folded.

With the cover structure fitted in place, and the leg portions folded, after the manner illustrated in Fig. 14, and held in the folded position by leg-holding hook 20, my improved machine can be readily handled and carried and otherwise transported. The supporting base or table top 1 has the forward end 21 extended beyond the position occupied by the side portion 14, and a handhole opening 22 is provided through this extension portion on a substantially centered location so that this opening 22 forms a convenient handle by which the machine can be handled and carried and transported.

The wallpaper roll holding and paper trimming and pasting and cutting parts of the machine are for the most part mounted on rods extending and connected between the supporting end members 9 and 10, and on shafts journaled across between these supporting end members. Consequently, when the cover structure is in place this will serve as a housing enclosing the operating parts.

Paste pan supporting rods 23 and 24 are secured across between the supporting end members 9 and 10, and a paste pan 25 is removably held upon these rods by paste pan supporting clips 26 and 27, a bearing supporting rod 28 is secured across between the supporting end members 9 and 10 near the upper edges thereof and slightly rearwardly from the inner side of the paste pan 25. A lower bearing supporting rod 29 is connected across transversely substantially below the upper bearing supporting rod 28, and to assure a proper space between the upper and lower bearing supporting rods, depending brackets 30 are provided for the lower bearing supporting rod. An upper forward supporting rod 31 is connected across between the supporting end members 9 and 10 upwardly and forwardly from the paste pan supporting rod 23, and a rear supporting rod 32 is connected across between the supporting end members 9 and 10, adjacent to the lower rear corner. With this arrangement of the several cross and supporting rods, a supporting frame structure is provided, and this entire supporting frame structure is made sufficiently rigid to support the weight of parts carried thereby and to ensure proper and accurate operation and functioning of the parts when the machine is in use.

Figures 2, 7, 8, 9, 10, 11:
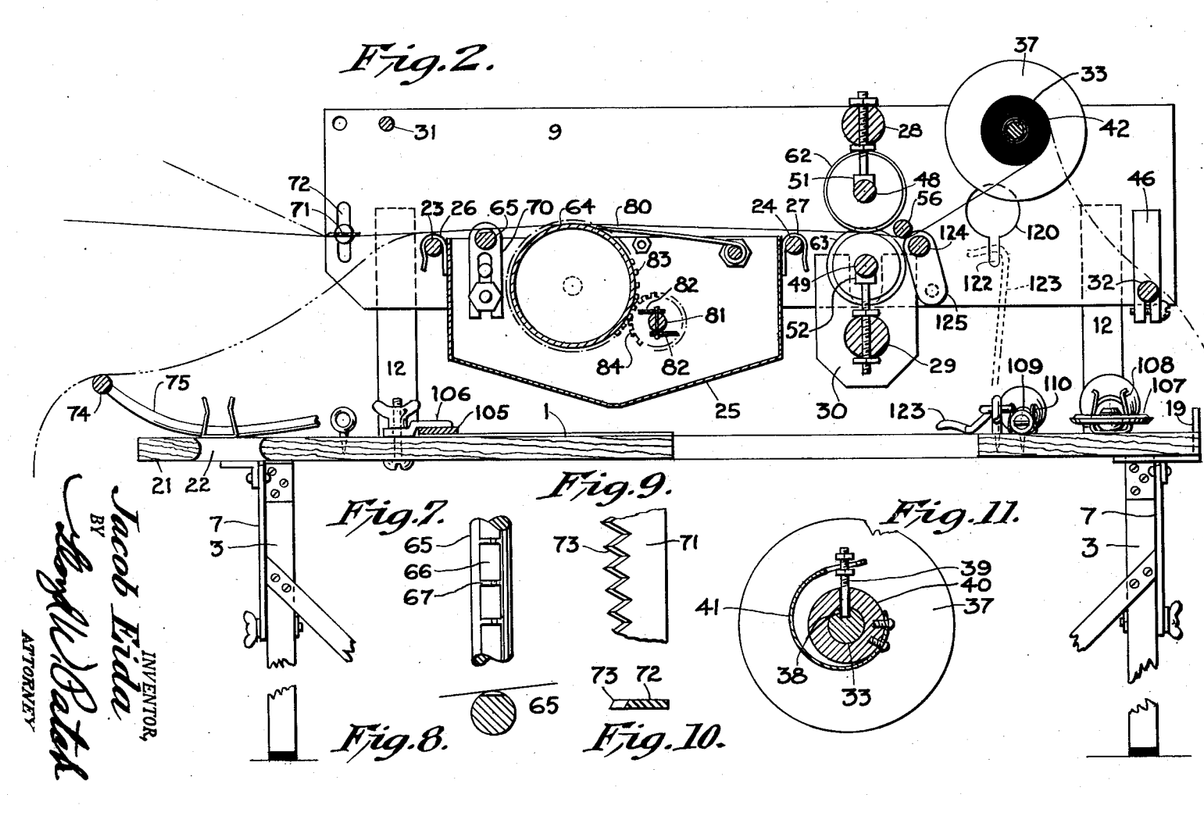
Fig. 2 is a vertical sectional view taken across the operating mechanism substantially on line 2—2 of Fig. 4.
Fig. 7 is a fragmentary elevational view of a part of the paste-spreading rod.
Fig. 8 is a view taken transversely through the rod as shown in Fig. 7.
Fig. 9 is a view in plan showing a fragment of the paper-cutting member for severing the desired length of the strip.
Fig. 10 is a view taken in section transversely across the showing in Fig. 9.
Fig. 11 is a sectional view showing the paper roll holding spool adjustable to take rolls of wallpaper of different lengths.

A paper roll supporting spool shaft 33 is removably and rotatably mounted in bearings at the upper edges and near the rear of the supporting end members 9 and 10, and this shaft 33 is held in place by spring clip 34. A spool head 35 is mounted on the shaft 33 near one end, and is held in desired position thereon by use of a clamp screw 36. An adjustable spool head 37 is slidably mounted in shaft 33 toward the other end thereof, and adjustable spool head 37 is adapted to be moved and adjusted axially on the shaft 33 to accommodate wallpaper rolls of different widths. Shaft 33 has a plurality of suitably spaced and located bolt-receiving sockets 38 formed substantially radially therein, and a bolt 39 slidable through and opening in the spool hub 40 is resiliently urged by bolt-retaining spring 41 inwardly to be seated in one of the bolt sockets 38. In this way, the adjustable spool head 37 is adjustable to two or more different fixed locations to accommodate two or more widths of rolls of wallpaper. Minor adjustments to suit the particular length of a roll of wallpaper can be made by adjustments permitted to be made in the position of spool head 35. Further, the provision of the clamp screw at 36 allows ready release and removal of spool head 35 so that a roll of wallpaper can be fitted endwise onto the paper roll supporting spool shaft 33. Different rolls of wallpaper will have openings through the middle thereof of different diameters, and to ensure a properly centered supporting roll of wallpaper, as indicated at 42, it is desirable that spring centering clips be provided to be fitted in each end of the roll of wallpaper, as indicated at 43 and 44. These spring centering clips are sleeve portions adapted to loosely receive the shaft 33, with spring fingers bent or curved outwardly to fit within the end of the opening through the roll of wallpaper and to resiliently and automatically function to properly support and center the roll of wallpaper 42. Spring clip 34 will bear frictionally against the end of shaft 33 to serve as a frictional brake to prevent loosening of the roll of wallpaper or overrunning as a length of wallpaper is drawn from the roll. A crank handle 45 is provided at one end of the paper roll supporting spool shaft 33 so that this shaft can be rotated to wind or rewind wallpaper onto the spool structure.

When a roll of wallpaper is being handled, which roll is not evenly and smoothly wound, the spool structure can be employed to wind and form a roll, by winding a suitable length of the end of the paper onto the spool structure to retain said end in place, and then operating the crank handle 45 to continue the winding or reeling operation to form the roll. Paper winding guides 46 and 47 are adjustably mounted on rear supporting rod 32, to guide the wallpaper when this is being wound upon the spool structure.

Feed and cutter roll carrying shafts 48 and 49 are rotatably mounted across between the supporting end members, by adjustable bearings adjustably mounted in any suitable manner on the end members, and these shafts are given bearing support intermediate their ends by middle adjustable bearings 51 and 52 on the upper and lower bearing supporting rods 28 and 29.

End paper supporting rolls 53 and 54, of rubber or other suitable cushioning material, are provided on upper feed and cutter roll carrying shaft 48, and similar paper roll supporting rolls 54 are provided on shaft 49. The rolls 53 and 54 adjacent to the spool head 35 will be held against endwise movement except as adjustments may be necessary to attain accuracy; and, the paper supporting rollers 53 and 54 adjacent to adjustable spool head 37 will be adjustable along and upon the shafts 48 and 49 to permit setting of the machine for use with the different lengths of rolls of wallpaper. To properly support and smooth the wallpaper as this is withdrawn from the roll 42, middle paper supporting rolls 55 are provided on shafts 48 and 49. A paper straightening and guiding rod 56 is mounted across between the supporting end members 9 and 10 to guide the end of the strip of paper, and the length of the paper as withdrawn from the roll 42, to pass between the paper supporting rollers. It will be appreciated that the several rollers of shaft 48 will be in contact with the several rollers of shaft 49, and as the strip of wallpaper passes therebetween, the various rollers will be in contact with the upper and lower faces of the strip of wallpaper. By adjusting the adjustable bearings, the degree of pressure exerted between the rollers of the two shafts 48 and 49 can be adjusted to suit different types or thicknesses of wallpaper or other material or wall covering. A crank handle 57 is provided on shaft 48 so that the rollers can be turned to feed the strip of paper therebetween.

Figure 5:
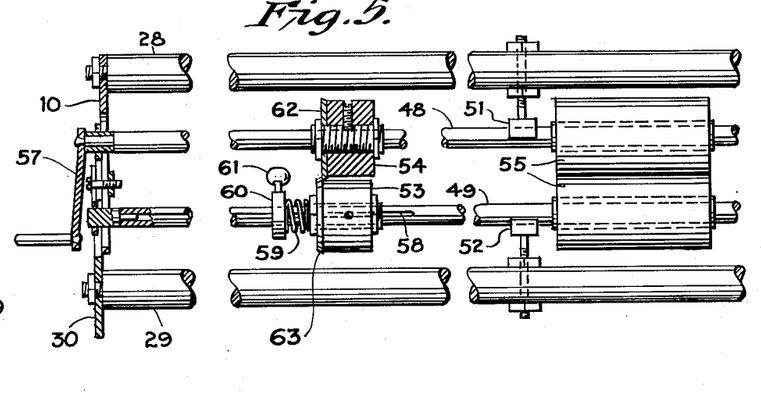
Fig. 5 is a fragmentary sectional view taken substantially on line 5—5 of Fig. 4.
Figure 6:
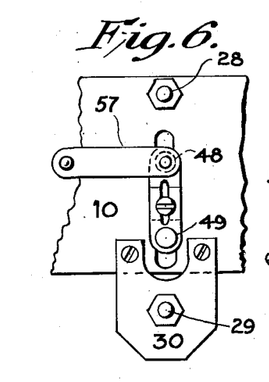
Fig. 6 is a view in end elevation of the parts as shown in Fig. 5.

As perhaps best shown in Fig. 5, the end rollers on shaft 49 are capable of endwise sliding movement, through provision of spline or keyway slots 58, and springs 59 fitted around the shaft 49 are urged against the slidable rollers by collars 60 held in place by adjusting screws 61. Trimming knives 62 are associated with the end rollers on shaft 48, and trimming knives 63 are associated with the movable end rollers on shaft 49. The trimming knives 62 and 63 have beveled edges, and the knives are arranged in overlapping relation so that as a roll of paper is carried through between the rubber end rollers, these trimming knives 62 and 63 will cut and trim the paper. The springs 59 assure that the trimming knife members will be in the proper cutting bearing relationship.

As stated, the paste pan 25 is removably held in place and the paste pan supporting rods 23 and 24, by paste pan suporting clips 26 and 27. This paste pan is of generally rectangular shape when viewed in plan, and is made of sufficient depth to contain a considerable quantity of paste, so that it will not be necessary to constantly refill this paste pan or trough. The top of the paste pan is preferably slightly lower than a line taken horizontally through the contact faces of the several rollers on shafts 48 and 49. The paste pan 25 is of sufficient length to extend substantially across between the supporting end members 9 and 10, and thus it is assured that the paste pan will accommodate various widths of rolls of wallpaper with which the machine may be used.

A paste-applying roller 64, having a paste-applying outer cylindrical wall, is rotatably mounted across between the ends of the paste pan 25, with its upper side above the top of the paste pan and its lower portion sufficiently low down to be submerged in the paste. In use, the length of the strip of wallpaper being drawn from the roll is in contact with the upper portion of the paste-applying roll 64, and paste will be applied evenly over and upon the back of the wall-paper. A paste-smoothing and scraping rod 65 is secured across between the ends of the paste pan 25, and in position so that the strip of paper passes thereover, from the paste-applying roll 64. This paste-smoothing and scraping rod 65 has a plurality of cut-away notches 66 on the upper side thereof, meeting intervening and spaced-apart paper supporting ribs 67. In use, the strip of paper will ride over the ribs 67, and the ducts of the cut-away notches 66 will determine the amount and thickness of the layer of paste as permitted to remain on the paper, excess paste being scraped off to return to the paste pan. A setting handle 68 extends laterally at one end of the paste-smoothing and scraping rod 65 for rocking this rod to secure desired settings to vary the depth of the layer of paste permitted to remain upon the wallpaper, and a setting clamp 69 is provided to retain settings of the paste-smoothing and scraping rod. The rod 65 also serves as a support for the paper as this is pulled forwardly, and the rod is provided with height-adjusting brackets 70 by which it can be raised or lowered to the desired position to clear the front of the paste pan 25.

A paper-cutting knife 71 is adjustably mounted transversely across the machine between the supporting end members 9 and 10, this knife being adjustable within the slots 72 so that the knife can be located in such position that the strip of paper will pass underneath. As perhaps best shown in Figs. 9 and 10, the knife 71 has cutting teeth 73 thereon, so that the paper, with the paste applied thereto, can be more readily severed or cut or torn across by the user. In use, the strip of paper will be threaded through the machine substantially as shown in Fig. 2 of the drawings, and the end of the strip of paper can be grasped and the paper can be pulled out to the desired length, substantially as shown by the full lines of Fig. 2. Then, when the desired length has been drawn out and it is desired to cut the paper, the strip will be lifted upwardly, substantially as shown by the dotted lines, and the paper can be cut or torn by this upward pulling force bringing the paper against the cutting teeth 74. After the desired length of the pasted strip of wall paper has been drawn out, it may be found desirable to fold the pasted strip, after the manner usually employed by paperhangers, and I provide a strip supporting rod 74 extending transversely on the machine and projected forwardly by being swingably mounted through the medium of supporting rods 75. Through this construction, the strip supporting rod 74 can be swung downwardly and outwardly to give a support for the pasted strip of paper so that the user can fold the strip and manipulate the same, without getting paste on the table or other parts of the machine. The relation of the parts is such that the strip of paper can then be pulled upwardly to the cutting position to be severed by the paper-cutting knife 71.

Figures 3, 12:
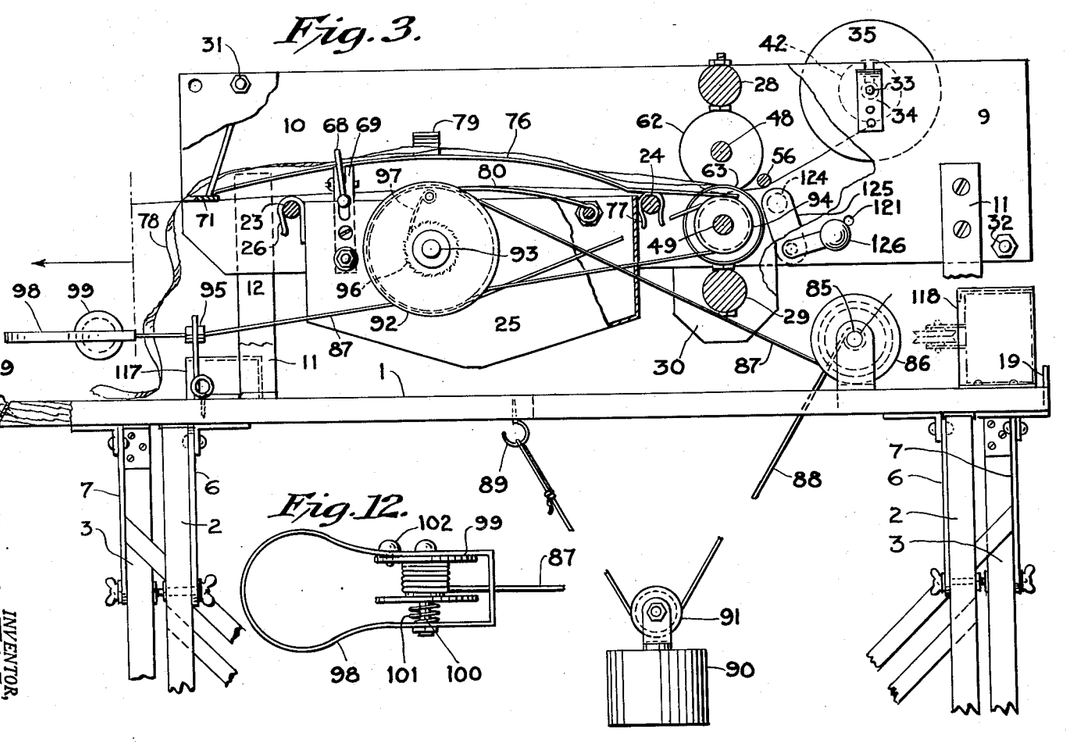
Fig. 3 is a view similar to Fig. 2, taken substantially on line 3—3 of Fig. 4.
Fig. 12 is an enlarged elevational view showing the means for adjusting the line or cable employed to show the desired length of the strip.

In the use of the machine, the trimming knives 62 and 63 will trim the strip before the strip reaches the paste-applying roller 64, and it is desirable that the trimmed edges be carried through the machine out of contact with the paste-applying roller 64, so that these trimmings can be readily collected and disposed of without thought or danger that they will interfere with or come in contact with the pasted strip of paper. Trimming strip guides 76 are carried by spring clips 77 adjustably fitted on the transverse rod 24, and these trimming strip guides 76 are therefore adjustable to different positions corresponding with the length of different rolls of wallpaper. Two trimming strip guides 76 are employed, and the forward part of each guide is carried upwardly, substantially as shown in Fig. 3, and is of such length that it rests upon the paper cutting knife 71 for support. Each trimming strip guide 76 has an extension which projects substantially to the line where the paper is cut or trimmed, and in this way the trimmed strip is guided upwardly over the paste-applying roller 64, and this trimmed or waste strip will accumulate at the forward side of the machine, substantially as indicated at 78. Guide fingers 79 are provided on the trimming strip guides 76 to ensure that the trimmed strip 78 will be properly guided away from the strip of paper as this is carried over the paste-applying roller.

With the structure as set forth, the selvage or trimmed edges of the roll of paper will not have any paste applied thereto, and consequently these strips can be readily collected and disposed of. It is essential that the paste be applied by the paste roller 64 substantially to the edges of the trimmed strip of wallpaper; but, it is desirable that excess paste shall not be applied at the edges of the trimmed strip. With this in mind, I provide paste scrapers 80 mounted substantially as shown in Fig. 2, so that these paste scrapers will wipe or scrape off paste on the surface of the paste-applying roller 64, in the peripheral area adjacent to the edges of the trimmed strip, before the strip comes in contact with the upper part of the paste-applying roller. In this way, the edges of the trimmed strip are kept clean and free of paste, and there is no danger or possibility that paste will accumulate on the edges and will run over onto the surface of the strip of paper.

With the parts constructed and operating and functioning in the manner set forth, it is possible to trim wallpaper as taken from a roll, to apply paste in any desired thickness or quantity as may be required for the particular wallpaper, to draw out the desired length of pasted wallpaper, and to then cut across the strip to sever the desired length. While the contact of the strip of paper with the paste-applying roller will exert frictional force to rotate this roller 64, there is a drag due to the consistency of the paste in paste pan 25, and furthermore, it is desirable that the paste be constantly stirred or mixed so that it will be of the desired consistency as carried up for application to the underside of the strip of paper, by the paste-applying roller 64. A paste mixer shaft 81 has paste mixer blades 82 thereon, and this shaft is mounted transversely within the paste pan 25 below the normal level of paste therein. Paste-applying roller 64 has a gear 83 rotating therewith, and a pinion 84 on the paste mixer shaft 81 meshes with this gear 83 so that as the paste-applying roller 64 is rotated, mixer shaft 81 will be rotated at greater speed to accomplish the desired mixing action through mixer blades 82.

Figure 4:
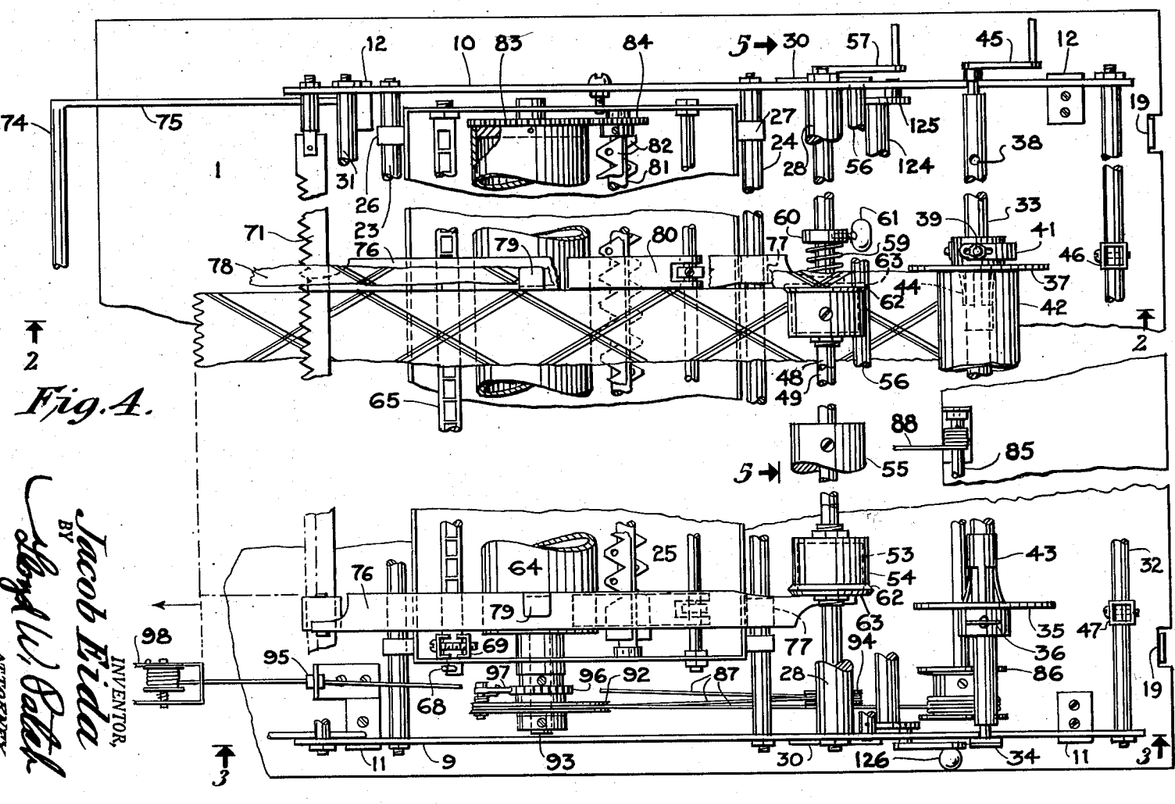
Fig. 4 is a top plan view of the operating mechanism with parts broken away to better show the construction and assembly of the parts.

It is desirable that means be provided for rotating paste-applying roller 64, when the strip of paper is being drawn out; and, my invention contemplates also that means be provided to indicate to the operator or user when the desired length of the strip has been attained. With these purposes in mind, I provide a winding shaft 85 mounted transversely on the supporting base or table 1 at a point well back thereon. This winding shaft 85, as perhaps best shown in Figs. 3 and 4, has a winding drum 86 thereon for reception of a measuring and operating cable or line 87. An operating winding cable 88 has one end thereof attached to and wound on the winding shaft 85, and this operating cable 88 passes downwardly through an opening in the supporting base or table top 1 and has its other end connected detachably with a hook or other support 89. An operating weight 90 having a pulley wheel 91 thereon has the operating winding cable 88 run through this pulley before being connected with the hook or anchoring means 89, and the operating weight 90 is thus suspended on the slack of operating winding cable 88, beneath the supporting base or table top 1, so that pull is exerted on cable 88 to normally urge winding shaft 85 to rotate in a direction to wind measuring and operating cable or line 87 onto the winding drum 86.

An operating pulley 92 is rotatably mounted on an outer end of the paste roller shaft 93, substantially in alignment with the winding drum 86, and an idler pulley 94 is revolubly mounted on shaft 49, substantially in alignment with the operating pulley 92. The measuring and operating cable or line 87 is carried from winding drum 86, upwardly around the operating pulley 92 and then rearwardly around idler pulley 94, and forwardly through a line or cable guide 95 carried by the supporting base or table top near the front thereof and at a point to be conveniently accessible at one edge of the strip of paper being carried through the machine.

A ratchet wheel 96 is fixedly carried by paste roller shaft 93 in proximity to the revolubly mounted pulley 92, and a spring pawl 97 is provided on pulley 92 in position to engage the teeth of ratchet wheel 96.

With this arrangement of the winding cable and associated parts, as the end of the measuring and operating cable or line 87 is drawn outwardly through the guide 95, this cable passes pulley 92 to be revolved in a direction with the spring pawl 97 thereof engaging the ratchet wheel 96, and consequently shaft 93 and the paste roller 64 will be revolved. As the measuring and operating line or cable 87 is drawn out from the winding drum 86, winding shaft 85 will be revolved to take in or wind up operating cable 88, against the force of the weight 90, and as the pulling force on measuring and operating cable or line 87 is slackened or released the operating weight 90 will exert pulling force on operating winding cable 88 to revolve winding shaft 85 to again wind measuring and operating cable or line 87 on winding drum 86. In this phase of the operation, cable 87 will rotate operating pulley 92 in an opposite direction, with the spring pawl 97 riding over the teeth of ratchet wheel 96, and accordingly the paste-applying roller 64 will remain stationary.

Figure 1:
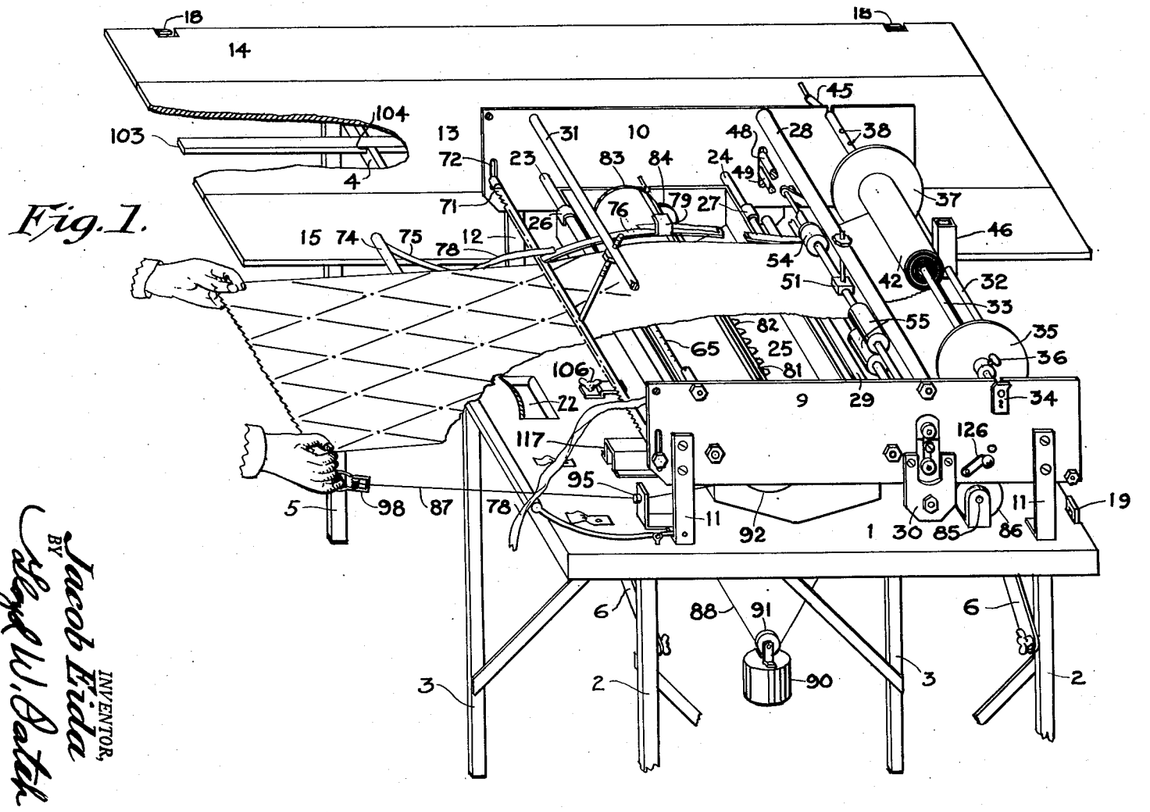
Figure 1 is a view in perspective showing a machine constructed in accordance with my invention, and with parts broken away to better show the construction and the operation.

It is the thought and intention that the operator can exert pulling force on measuring and operating cable or line 87, with one hand, at the same time that the strip of paper is being drawn out over the paste-applying roller 64, after the manner illustrated in Fig. 1.

The measuring and operating cable or line 87 is adapted to be employed, substantially after the manner illustrated in Figure 1 of the drawings, to permit the operator or user to draw out a desired length of the strip of the paper, to reach from ceiling to baseboard on a side wall, or to a desired length for use upon a ceiling; and, it is therefore essential that provision be made for adjusting the effective length of this cable or line. With this in mind, I provide a ring-shaped handle 98 connected at the outer end of the line or cable 87, after this end has passed through the line or cable guide 95. This ring-shaped handle is somewhat flattened and has an adjusting drum 99 rotatably mounted on shaft 100. The ring-shaped portion at the shaft is somewhat wider than the adjusting drum, and a coil spring 101 is mounted on the shaft 100 to urge the adjusting drum 99 into contact with one side of the handle portion 98. An adjusting pin 102 is carried by this side of the ring-shaped handle 98, and adjusting drum 99 is provided with an opening to receive the pin so that the adjusting drum will be held against rotation on the shaft 100. With this arrangement of parts, the adjusting drum 99 can be moved over against the pressure of spring 101, and can then be rotated on shaft 100 to wind the measuring and operating cable or line thereonto or therefrom. When the desired length has been attained for the line or cable 87, adjusting drum 99 is released and spring 101 then moves this adjusting drum axially along shaft 100 to a position where the adjusting pin 102 engages in the opening and holds the adjusting drum 99 against turning on the shaft. In cutting the parts for a particular length of strip of wallpaper, cable or line 87 is drawn through the line or table guide 95 until all of the line or cable is unwound from winding drum 86, and then the user can measure the line from the guide 95 and can make appropriate adjustment on adjusting drum 99, for the desired length. Drawing out the measuring and operating cable or line 87 will cause winding shaft 85 to be rotated and operating winding cable 88 will be reeled onto the shaft 85 against the force exerted by the suspended weight 90. The operating cable or line 87 is again released, the weight 90 will exert pull upon operating winding cable 88, and this cable will be unreeled from the shaft 85, causing the shaft to be rotated to wind measuring and operating cable 87 onto the drum 86.

Figure 13:
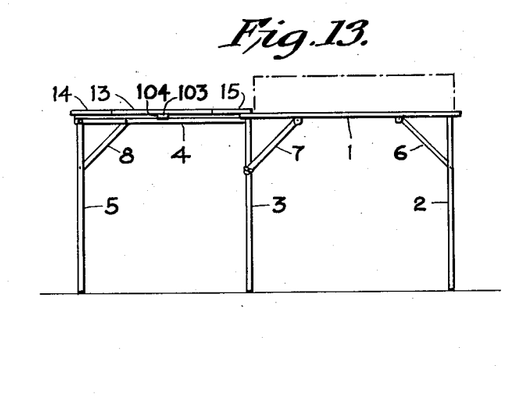
Fig. 13 is an elevational view on a reduced scale showing the supporting structure and leg assembly.

As has been stated, the cover top portion 13 has the cover side portions 14 and 15 hingedly connected therewith, and the top portion 13 has a batten strip 103 secured transversely thereacross on the inner side. The side members of the foldable extension frame 4 have notches 104 therein, and when the cover structure is fitted in place as a table, as perhaps best shown in Figures 1 and 13, the batten strip 103 is received in the grooves or notches 104, and the table top structure is then held in proper position and against sliding or movement upon the extension frame 4. In this manner, an extension table top is provided at a position to be conveniently and readily accessible for use by the operator to support the pasted paper during cutting or splitting operations and the like.

I have found that a straight-edge 105 can be conveniently stored on the table top 1 and can be held in place beneath the paste pan 25, by a clamping clip 106.

A rotary paperhanger's cutting knife 107 can be used to advantage against the straight edge 105, and I have found it convenient to provide a spring clip 108 on the supporting base or table top 1 so that this cutting knife can be conveniently carried. For use in servicing and adjusting the parts, a screw driver 109 is conveniently held and carried by a spring clip 110. It will be appreciated that the rotary cutting knife 107 is also available for use in cutting paper on the wall, as at the ceiling and at the baseboard and at other desired places.

Figure 18:
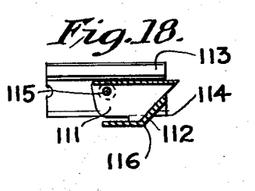
Fig. 18 is a view in side elevation of a paper slitting or cutting tool adaptable for use along a straight-edge.
Figure 19:
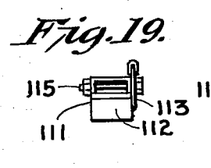
Fig. 19 is a view in end elevation of the structure shown in Fig. 18.

In some instances, it may be found desirable to provide a special knife for use against the straight edge, for cutting and splitting paper and for other uses; and, I have illustrated such a special knife in Figures 18 and 19 of the drawings. The knife body portion 111 has one end thereof inclined as at 112, and this body portion is of such size and shape that when a razor blade 113 is fitted on the side of the body portion, a corner of the razor blade will project, as at 114, as a cutting edge. The razor blade is mounted and held in place on the knife body portion 111, by blade clamping bolt 115. In use, the body portion 111 is grasped and the razor blade 113 is moved along the edge of the straight edge 105. This body portion 111 is supported with a rocking corner 116 upon or near the upper surface of the paper to be slit or cut, and the body portion 111 can be rocked, as around the corner 116, so that the extending cutting corner 114 of razor blade 113 will cut into and through the paper, to the desired extent. A knife storage casing 117 mounted on the supporting base or table top provides a convenient receptacle for storage of the cutting knife, when this is not in use.

When it is desired to fold the machine for carrying or transportation, the end of winding cable 88 is released from hook 89, and weight 90 can then be readily removed. The weight can be conveniently stored in a case 118 mounted on the upper side of the supporting base or table top. When the machine is folded, the operating winding cable 88 can be wound around cleat 119, and this will maintain measuring and operating cable or line 87 in proper fitting upon the various parts, and against becoming loose or entangled.

The paper roll supporting spool shaft is revolubly mounted rather high up between the supporting end members 9 and 10, so that the spool portions or heads 35 and 37 extend appreciably above the top edges of the supporting end members 9 and 10. As stated, the cover top portion and the cover side portions are intended and adapted to fit substantially against the upper edges and the side edges of the supporting end members 9 and 10, and when it is desired to close the machine, the paper roll supporting spool shaft 33, with the parts associated therewith, is removed from the bearings which this shaft occupies when in operative position. The handle of this shaft 33 is then inserted through storage opening 120 and the shaft is fitted in storage bearings 121 and 122, in which position the spool head portions 35 and 37 are disposed well down below the upper edges of the supporting end members 9 and 10. A storage hook 123 is then caught over the shaft to retain this shaft in place.

Strip supporting rod 74 is then swung up to a raised position, and substantially all parts are then within the confine of the upper and end edges of the supporting end members 9 and 10. The top cover portion consisting of the parts 13, 14, and 15, is then removed from the foldable extension 4, and the eyes 17 are caught on hooks 16, so that the top cover portion is disposed substantially after the manner shown in Fig. 15, with the side cover portion 14 folded down over the forward side of the space between the supporting end members 9 and 10. Fastening hooks 18 are then caught in fastening eyes 19, and the cover structure is secured in place. Brace 8 is released, and the legs 5 and the foldable extension 4 can then be folded down, following which braces 6 and 7 will be released and the sets of folding legs 2 and 3 will be folded under against the under side of the supporting base or table top 1. Leg-holding hook 20 is then fitted in place to hold the extension frame and the like structure in the folded relation.

While the paper straightening and guiding rod 56 will smooth the paper as drawn off or unrolled from the roll, it is perhaps desirable that a paper supporting rod 124 be provided beneath the rod 56 to support the paper from below so that the paper strip will not sag down. As illustrated in Fig. 2, this supporting rod 124 is swingably mounted by links 125 so that it can be swung back to be separated from rod 56 to give room for threading the end of the roll through the machine. Handle 126 can be provided to swing rod 124 to the operative position adjacent to rod 56 and to the position separated from said rod 56.

From the foregoing it will be seen that I have provided a wallpaper trimming and pasting and cutting machine which is of simple and inexpensive construction, capable of being folded for transportation, and which can be used on the job for trimming and pasting and cutting desired lengths of strips of wallpaper, from rolls of different widths, and with the parts operating positively to prevent tearing of the paper as it is drawn from the roll of wallpaper, and to measure the desired length of strip.

While I have herein shown and described only certain specific embodiments of my invention, and have set forth and have suggested only certain other possible adaptations, it will be appreciated that many changes and variations can be made in the form and construction and arrangement of the parts, and in the manner of use, without departing from the spirit and scope of my invention.

I claim:

1. A wallpaper trimming and pasting and cutting machine comprising a supporting table top carried at a working elevation, supporting end members upstanding near the ends of said table top, wallpaper roll supporting spool means at the rear between said supporting end members, paper-carrying and advancing rollers in front of the roll-supporting spool, rotatable edge-trimming knives carried by the paper advancing rollers operable to trim the edges of a strip of paper passing through the paper-carrying and advancing rollers, a pastepan and rotatable paste-applying means in front of the strip-carrying and edge-trimming means, a transversely disposed strip-cutting knife carried between the supporting end members forwardly of the paste pan, cable pulleys connected with the paper advancing rollers and the rotatable paste applying means, and manually actuatable measuring cable means carried over said pulleys to operate said paper-carrying and advancing rollers and said edge-trimming knives and the paste-applying means in the paste pan as a strip of paper is drawn from the wallpaper roll to a length determined by said measuring cable.

2. A wallpaper trimming and pasting and cutting machine comprising a supporting table top, foldable legs supporting said table top in a position for use, an extension frame at one side of said foldable leg structure, supporting end members upstanding near the ends of said table top, wallpaper roll-supporting spool means at the rear between said supporting end members, a paste pan and paste-applying means in front of said spool means, strip-cutting means disposed transversely between the supporting end members forwardly of the paste pan, a cover structure having foldable sides cooperable with said upstanding supporting end members to serve as an enclosure and cover for the main parts of the machine for transportation, and said cover structure being adapted to be flattened out and mounted on the extension supporting frame as a work table.

3. A wallpaper trimming and pasting and cutting machine comprising a supporting table top carried at a working elevation, supporting end members upstanding near the ends of said table top, wallpaper roll-supporting spool means at the rear between said supporting end members, a paste pan carried between the supporting end members in front of said spool means, a paste-applying roller revoluble within the paste pan and having its upper side presented to apply paste to the back of a strip of paper as drawn from the roll of paper on the spool, a paper feeding roller between the spool and the paste roller, said paste-applying roller and the feeding roller having cable pulleys thereon, a measuring cable extending around the pulleys of the paste roller and the feeding roller to revolve said rollers as the measuring cable is drawn out alongside of a strip of wallpaper, a cutting knife disposed transversely across between the supporting end members forwardly of the paste-applying roller, a winding drum for said measuring cable, and means revolving said drum to rewind the cable when released.

4. A wallpaper trimming and pasting and cutting machine comprising a supporting table top carried at a working elevation, supporting end members upstanding near the ends of said table top, wallpaper roll-supporting spool means at the rear between said supporting end members, a paste pan carried between the supporting end members in front of said spool means, a paste-applying roller revoluble within the paste pan and having its upper side presented to apply paste to the back of a strip of paper as drawn from the roll of paper on the spool, said paste-applying roller having a cable pulley thereon, a measuring cable extending around the pulley of the paste roller to revolve said paste roller as the measuring cable is drawn out alongside of a strip of wallpaper, a cutting knife disposed transversely across between the supporting end members forwardly of the paste-applying roller, means to retract said cable after it has been drawn out and handle means on the end of the measuring cable having an adjusting drum by which the length of the measuring cable can be adjusted.

5. A wallpaper trimming and pasting and cutting machine comprising a supporting table top carried at a working elevation, supporting end members upstanding near the ends of said table top, wallpaper roll-supporting spool means at the rear between said supporting end members, wallpaper carrying and advancing rollers in front of the roll-supporting spool, a paste pan carried by the supporting end members in front of the paper-carrying and advancing rollers, a paste-applying roller revoluble in said paste pan, a belt pulley by which said paper-carrying and advancing rollers are rotated, a belt pulley by which said paste-applying roller is rotated, a measuring cable carried by the supporting table and extending over said pulleys in position to be grasped by the user and to be pulled out alongside a strip of paper to show the desired length and at the same time to actuate said pulleys to operate the paper-carrying and advancing rollers and the paste-applying roller, and means to retract said cable after it has been drawn out.

6. A wallpaper trimming and pasting and cutting machine comprising a supporting table structure having a supporting top, supporting end members upstanding near the ends of said table top, wallpaper roll-supporting spool means at the rear between said supporting end members, paper-carrying and advancing rollers in front of the roll-supporting spool, edge-trimming knives revolubly carried by the paper-carrying and advancing rollers to trim the edges of a strip of paper advanced by said rollers, a paste pan removably carried between said upstanding supporting end members forwardly of the paper-carrying and advancing rollers, a paste-applying roller rotatable within the paste pan and having its upper portion extending above the pan to apply paste to the under side of a strip of paper drawn thereover, cable pulleys connected with the paper-carrying and advancing rollers and with the paste-applying roller, a retractable measuring cable extending over said pulleys to turn said paper-carrying and advancing rollers and operate the edge-trimming knives and rotate the paste-applying roller as the measuring cable is pulled out by the operator alongside of a strip of paper as drawn out from the machine, a severing knife for the strip secured transversely between the supporting end members forwardly of the paste pan, and means retracting said measuring cable when outward pull thereon is released.

JACOB EIDA.

REFERENCES CITED

The following references are of record in the file of this patent:

UNITED STATES PATENTS

| Number | Name | Date |
|---|---|---|
| 650,215 | Avery | May 22, 1900 |
| 742,807 | Tharp | Oct. 27, 1903 |
| 757,565 | Norwood | Apr. 19, 1904 |
| 885,385 | Senne | Apr. 21, 1908 |
| 1,058,957 | Frohn | Apr. 15, 1913 |
| 1,131,685 | Dunn et al. | Mar. 16, 1915 |
| 1,213,728 | Beach | Jan. 23, 1917 |
| 1,575,868 | Roles | Mar. 9, 1926 |
| 1,987,197 | Krueger et al. | Jan. 8, 1935 |
| 2,241,007 | Thomas | May 6, 1941 |
| 2,352,978 | Shoemaker | July 4, 1944 |